Dec. 26, 1933.                   C. BROWN                    1,941,162
DOUBLE ROOF CONSTRUCTION FOR VEHICLES
Original Filed Dec. 3, 1929        2 Sheets-Sheet 1

INVENTOR
CARLETON BROWN
BY Fetherstonhaugh & Co
ATTORNEYS

Dec. 26, 1933.    C. BROWN    1,941,162
DOUBLE ROOF CONSTRUCTION FOR VEHICLES
Original Filed Dec. 3, 1929    2 Sheets-Sheet 2

INVENTOR
CARLETON BROWN
BY Fetherstonhaugh & Co
ATTORNEYS

Patented Dec. 26, 1933

1,941,162

UNITED STATES PATENT OFFICE 1,941,162

DOUBLE ROOF CONSTRUCTION FOR VEHICLES

Carleton Brown, Westmount, Quebec, Canada

Application December 3, 1929, Serial No. 411,324
Renewed November 14, 1933

6 Claims. (Cl. 296—137)

This invention relates to expansible vehicles and has particular reference to vehicle bodies of the longitudinally split type disclosed in my co-pending application Serial No. 379,794, filed July 20, 1929.

The object of the present invention is to provide a double roof which may be arranged, in various ways, to provide increased head room or to roof the gap left between the two half body sections when said sections are separated or pulled apart for expansion purposes.

According to this invention, each half body is equipped with a double roof, including reversely curved main and supplementary roof plates of duplicate construction. When the body is contracted to its smallest dimensions, the supplementary roof plates merely overlie the main roof plates and are held thereon by any suitable form of fastening means. When the two half bodies are separated for expansion purposes, or when the main roof plates are swung upwardly to increase the head room, the gap left between the peak edges of said main roof plates is closed by the inter-position of the supplementary roof plates. The supplementary roof plates, when disposed to bridge the gap left between the separated main roof plates, may be connected together and to the main roof plates in various ways, as will hereinafter appear from the following detailed description and accompanying drawings.

Figure 1:
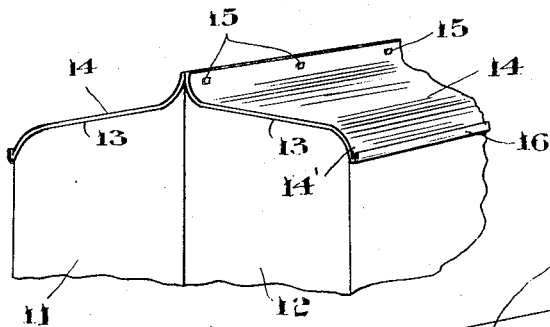
Figure 1 is a fragmentary perspective view showing the application of one form of my improved double roof to an expansible vehicle body of the longitudinally split type, the body being shown in its contracted condition.
Figure 2:
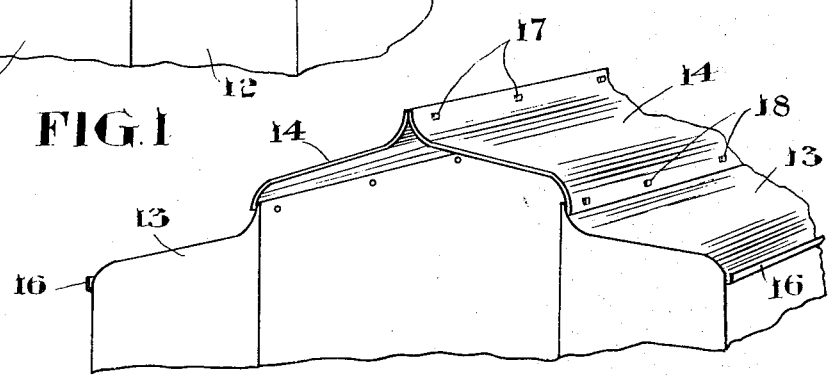
Figure 2 is a fragmentary perspective view showing the manner in which the supplementary roof plates are arranged to bridge the gap between the main roof plates when the two half sections of the body are separated, or pulled apart for expansion purposes.

In describing the details of construction, reference will be had initially to the form of invention illustrated in Figures 1 and 2. In these figures, the two halves of the vehicle body are indicated at 11 and 12. These half bodies (as more fully explained in my co-pending application previously referred to) are movable laterally from the abutting position shown in Figure 1 to the separated position shown in Figure 2. Each half body is provided with a double roof, including a main roof plate 13 and a supplementary roof plate 14. These plates are of duplicate construction and are reversely curved, as shown in the drawings. When the two half bodies are brought together, as in Figure 1, the inner or peak edges of the plates 13 and 14 of one half body are secured to corresponding edges of the plates 13 and 14 carried by the other half body. The securing means employed may consist of bolts 15 or any other suitable type of fastenings. The outer or wall edges 14' of the supplementary plates 14, when arranged as shown in Figure 1, are seated in drain gutters 16 carried by the half bodies 11 and 12. However, the said outer edges of the supplementary plates 14 may also be secured to the half bodies by bolts or other fastening means, if desired. When the half bodies 11 and 12 are moved apart for expansion purposes, the gap formed between the main roof plates 13 is closed by the inter-position of the supplementary roof plates 14, as shown to advantage in Figure 2. In this figure, it will be noted that the peak edges of the plates 14 are bolted or otherwise secured together as indicated at 17, while the outer or wall edges of said plates are bolted or otherwise fastened as at 18 to the peak edges of the main plates 13.

Figure 3:
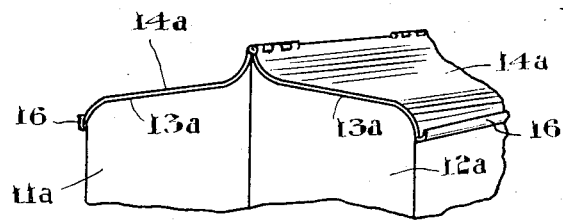
Figure 3 is a view similar to Figure 1, but disclosing a modification of the double roof construction.
Figure 4:
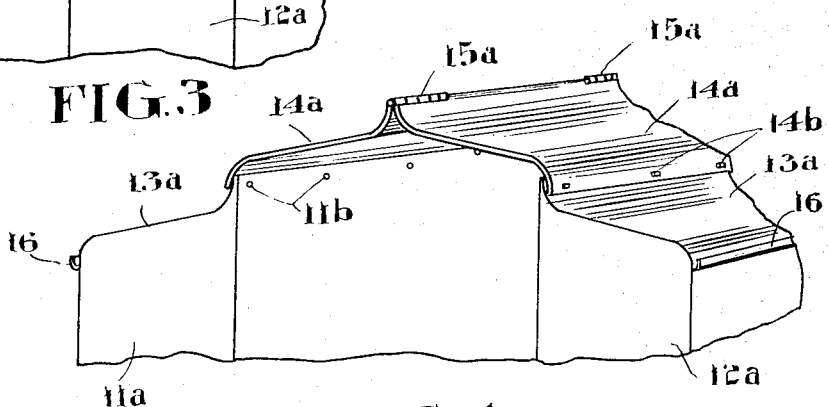
Figure 4 is a fragmentary perspective view showing the manner in which the modified form of double roof disclosed in Figure 3 is arranged to bridge the gap between the separated main roof sections.

Figures 3 and 4 disclose a slight modification in which the supplementary roof plates 14a have their peak edges permanently hinged together as indicated at 15a, the arrangement being otherwise the same as explained in connection with Figures 1 and 2. Figure 3 discloses the manner in which the hingedly connected supplementary plates 14a are arranged upon the main roof plates 13a, when the body sections 11a and 12a are moved together to contract the body to its smallest dimensions. Figure 4 discloses the manner in which the hingedly connected supplementary roof plates 13a are arranged to bridge the gap between the main roof plates 13a when the body sections 11a and 12a are separated for expansion purposes. In this figure, it will be noted that the outer or wall edges of the supplementary plates 14a are secured by bolts 14b to the peak edges of the main roof plates 13a.

Figure 6:
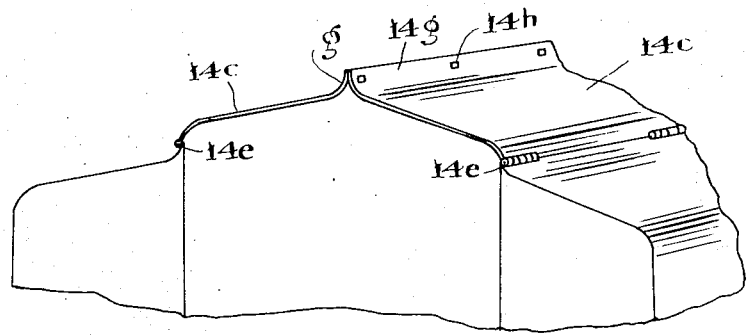
Figures 5 and 6 are views corresponding, respectively, to Figures 3 and 4, but showing a further modification of the double roof construction.
Figure 5:
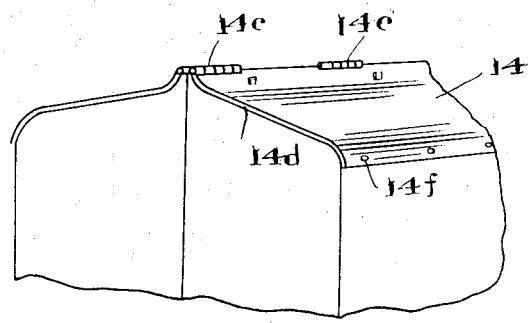

Figures 5 and 6 disclose a further modification in which the supplementary roof plate 14c, of each half body, is hinged along one edge to the main roof plate 14d, the hinge connection being indicated at 14e. The remaining or free edge of the supplementary plate 14c may be bolted or otherwise secured to the half body as indicated at 14f when the parts are arranged as shown in Figure 5. With this form of double roof construction, it will be noted that, when the two half bodies are separated as shown in Figure 6, the supplementary plates 14c may be swung upwardly and inwardly about the hinge connections 14e to bring the edges 14g of said plates into abutting engagement. These abutting edges are then bolted or otherwise secured together, as indicated at 14h.

Figure 7:
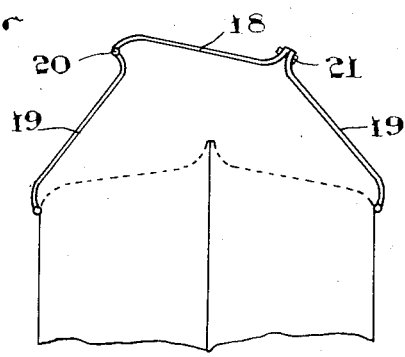
Figures 7, 8 and 9 are diagrammatic views illustrating various ways in which the main and auxiliary roof plates may be arranged to afford increased head room without expanding the vehicle body.

In the modification shown in Figure 7, only one supplementary roof plate 18 is employed. This plate is preferably hinged to one of the main roof plates 19, as indicated at 20, and may be bolted to the remaining main roof plate 19 as indicated at 21 when the several plates are arranged as shown. This particular arrangement of plates increases the head room without expansion of the body.

Figure 8:
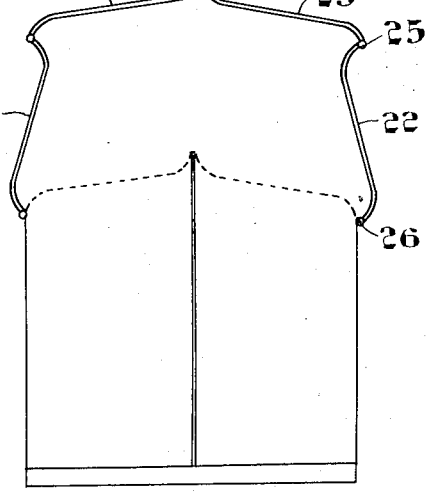

Figure 8 shows a further arrangement of the main and supplementary roof plates to increase the head room without expansion of the body. As shown in this figure, the main roof plates 22 are swung upwardly to substantially vertical positions and the gap between said plates is closed by the supplementary roof plates 23. The inner edges of the plates 23 are bolted together as indicated at 24 while the outer edges of said plates are hinged or otherwise secured to the plates 22, as indicated at 25. The plates 22 are hinged, as indicated at 26.

Figure 9:
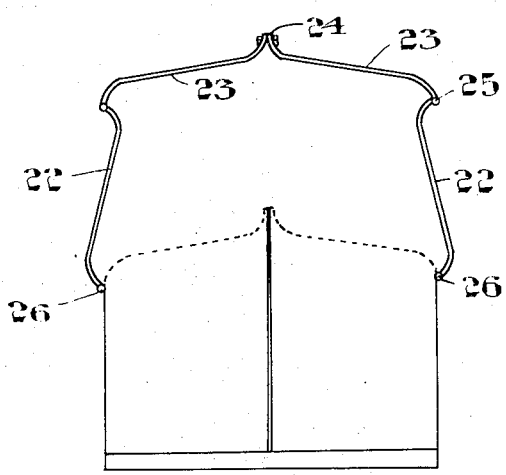

In view of the substantial degree to which the head room is increased by the described arrangement of plates 22 and 23, the initial height of the body may be increased as shown in Figure 9.

It may be explained here that the degree to which the body sections may be separated is limited so that the gap formed between the main roof plates is somewhat less than the combined width of the supplementary roof plates. Consequently, the supplementary roof plates, when secured in a position covering the gap, will necessarily have a slant somewhat greater than the slant or slope of the main roof plates.

Figure 10:
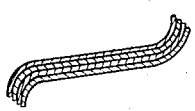
Figure 10 is a detail view showing the manner in which the roof plates may be nested for storage or shipment.

Some of the numerous advantages afforded by the double roof construction described in the foregoing may be generally summarized as follows: (1) The supplementary roof plates, when not in use, are conveniently carried, in an accessible position, by the main roof plates. (2) The supplementary roof plates may be quickly and easily arranged to bridge the gap which is formed between the main roof plates by separation of the body sections. (3) The main and supplementary roof plates, when made of steel or other metal, afford a very durable weather resistant type of roof. (4) The roof plates may be arranged in various ways to afford increased head room without lateral expansion of the body. (5) The duplicate construction and reverse curvature of the roof plates enables all of said plates, whether intended for the right or left hand side of the body, to be made by the same die. (6) The duplicate structure and reverse curvature of the roof plates also enables said plates to nest together, in a very desirable manner, for shipping and storage purposes, this nesting of the plates being shown to advantage in Figure 10.

In the foregoing description, I have set forth what I now consider to be the preferred applications of my improved double roof construction, but it will be understood that various modifications may be resorted to within the scope and spirit of the appended claims.

Having thus described my invention, what I claim is:

1. An expansible vehicle body comprising laterally separable body sections, each section including a floor, end walls, an outer side wall, and a roof plate having its outer edge hinged to the upper edge of the outer side wall, means for securing together the inner edges of the roof plates of the two sections when said sections are in a body contracting position and a supplementary roof plate normally carried upon each of the first mentioned roof plates, one or both of the supplementary roof plates being adapted to be arranged between and supportably connected to the inner edges of the first mentioned roof plates when the body sections are in a laterally separated or body expanding position.

2. An expansible vehicle body comprising laterally separable sections normally meeting along the center line of the body, each section including a floor, end walls, an outer side wall and a main roof plate having its outer edge hinged to the upper edge of the outer side wall, the inner edges of said main roof plates being normally secured together and a supplementary roof plate normally carried upon each of said main roof plates, said supplementary roof plates being adapted to be connected together and to the inner edges of the main roof plates to bridge the gap between the latter when the body sections are shifted to a laterally separated or body expanding position.

3. An expansible vehicle body comprising laterally separable body sections normally meeting along the center line of the body, each section including a floor, end walls, an outer side wall, and a main roof plate having its outer edge hinged to the upper edge of the outer side wall so as to be capable of upward swinging movement and a plurality of supplementary roof plates adapted, at times, to be arranged in contiguous relation with their inner edges secured together and their outer edges directly secured to the inner edges of the main roof plates.

4. An expansible vehicle body comprising a pair of laterally separable body sections adapted to be butted together to provide a contracted body or to be separated to provide an expanded body, each section including a floor, end walls, an outer side wall and a main roof plate having its outer edge attached to the upper edge of the outer side wall, a plurality of supplementary roof plates adapted in the expanded state of the body to be arranged in contiguous relation with their inner edges secured together and their outer edges directly secured to the inner edges of the main roof plates, said main and supplementary roof plates being reversely curved in transverse section.

5. An expansible vehicle body comprising a pair of laterally separable body sections adapted to be butted together to contract the body or to be separated to expand the body, each section including a floor, end walls, an outer side wall and a main roof plate having its outer edge attached to the upper edge of the outer side wall, and a supplementary roof plate adapted to be carried upon each of the main roof plates in the contracted condition of the body, said main and supplementary roof plates being reversely curved in transverse section and adapted to nest snugly together in their superposed relation, said supplementary roof plates being also adapted in the expanded state of the body to be arranged in contiguous relation with their inner edges secured together and their outer edges directly secured to the inner edges of the main roof plates.

6. An expansible vehicle body comprising a pair of laterally separable body sections adapted to be butted together to contract the body or to be separated to expand the body, each section including a floor, end walls, an outer side wall and a main roof plate having its outer edge attached to the upper edge of the outer side wall and a supplementary roof plate associated with each of said main roof plates, said supplementary roof plate having one edge hinged to the inner edge of the associated main roof plate and being swung to a position resting on the main roof plate when the body is in the contracted state, said main and supplementary roof plates being reversely curved in transverse section and said supplementary roof plates being also adapted, in the expanded state of the body, to be arranged with their inner edges secured together so as to close the gap formed between the main roof plates.

CARLETON BROWN.